US006399233B1

(12) United States Patent
Milliken et al.

(10) Patent No.: US 6,399,233 B1
(45) Date of Patent: Jun. 4, 2002

(54) TECHNIQUE FOR RAPID CURED ELECTROCHEMICAL APPARATUS COMPONENT FABRICATION

(75) Inventors: Christopher E. Milliken; Carrie Manon Hawk, both of South Euclid; Adam B. Brakas, Chesterland, all of OH (US)

(73) Assignee: Technology Management, Inc., Cleveland, OH (US)

( * ) Notice: Subject to any disclaimer, the term of this patent is extended or adjusted under 35 U.S.C. 154(b) by 0 days.

(21) Appl. No.: 09/604,188

(22) Filed: Jun. 27, 2000

Related U.S. Application Data
(60) Provisional application No. 60/146,289, filed on Jul. 29, 1999.

(51) Int. Cl.⁷ ................................................ H01M 8/10
(52) U.S. Cl. .......................... 429/30; 429/32; 429/20; 429/12; 429/41; 29/623.1; 29/623.3; 29/623.5; 427/115
(58) Field of Search ............................. 429/30, 20, 32, 429/12, 41; 29/623.1, 623.3, 623.5; 427/115

(56) References Cited

U.S. PATENT DOCUMENTS

| 4,499,663 A | 2/1985 | Zwick et al. ................. 29/623 |
| 4,510,212 A | 4/1985 | Fraioli .......................... 429/30 |
| 4,770,955 A | 9/1988 | Ruhl et al. ..................... 429/33 |

(List continued on next page.)

FOREIGN PATENT DOCUMENTS

| DE | 3922673 A1 | 1/1991 | ............ H01M/8/12 |
| EP | 222880 B1 | 5/1987 | ............ C25D/5/02 |
| EP | 0 355 420 A1 | 2/1990 | ............ H01M/8/24 |
| EP | 549695 B1 | 7/1993 | ............ H01M/8/24 |
| EP | 549695 B1 * | 12/1994 | ............ H01M/8/24 |
| GB | 2219125 A | 11/1989 | ............ H01M/8/12 |
| GB | 2318 447 A | 4/1998 | ............ H01M/8/24 |

OTHER PUBLICATIONS

Derwent Abstract of DE 3922673.

"Patterned Ceramic Green Films Using Curable Binders," S. Yoshikawa, C. Heartling, D. Smith and R. Newnham, Ceramic Transactions, Ceramic Powder Science III, eds. G. Messing, S. Hirano and H. Hausner, vol. 12, American Ceramic Society, Inc., Westerville, OH (1990) 553–560.

"Photopolymerization Reactions," Polymer Handbook, Fourth Edition, Brandup et al. editors, John Wiley & Sons, (1999) 169–181.

V. D. McGinnis, "Radiation Curing," Kirk–Othmer Concise Encyclopedia of Chemical Technology, Fourth Edition (1999) 1703–1704.

Primary Examiner—Gabrielle Brouillette
Assistant Examiner—Angela J. Martin
(74) Attorney, Agent, or Firm—Renner, Kenner, Greive, Bobak, Taylor & Weber

(57) ABSTRACT

A process for the fabrication of a component or component feature for an electrochemical apparatus including providing a printing medium comprising a rapid curable polymer containing carrier and a powder of a component material precursor, printing one of a uniform layer or a pattern of such printing medium on a substrate, and rapidly curing the curable polymer to form a cured part; and the parts made by this process. A process for the fabrication or a multi-layer cell of an SOFC including providing a printing medium comprising a radiation curable polymer containing carrier and a powder of a component material precursor, printing one of a uniform layer or a pattern of such printing medium on a substrate, and radiation curing the curable polymer to form a cured part; and the parts made by this process. The process can use an ultraviolet light curable polymer binder and electrode material powder in an industrial printer to form a solid fuel cell electrode component.

30 Claims, 3 Drawing Sheets

U.S. PATENT DOCUMENTS

| | | |
|---|---|---|
| 4,799,936 A | 1/1989 | Riley |
| 5,116,696 A | 5/1992 | Barp .............................. 429/26 |
| 5,198,312 A | 3/1993 | Irino et al. .................... 429/26 |
| 5,212,023 A | 5/1993 | Diethelm ..................... 429/26 |
| 5,256,499 A | 10/1993 | Minh et al. ................... 429/33 |
| 5,264,300 A | 11/1993 | Barp et al. .................... 429/30 |
| 5,269,902 A | 12/1993 | Khandkar et al. .......... 204/426 |
| 5,340,664 A | 8/1994 | Hartvigsen ................... 429/20 |
| 5,376,472 A | 12/1994 | Hartvigsen et al. ........... 429/32 |
| 5,445,903 A | 8/1995 | Cable et al. ................... 429/33 |
| 5,470,671 A | 11/1995 | Fletcher et al. ............... 429/26 |
| 5,514,486 A | 5/1996 | Wilson ......................... 429/30 |
| 5,549,983 A | 8/1996 | Yamanis ....................... 429/32 |
| 5,589,285 A | 12/1996 | Cable et al. ................... 429/13 |
| 5,595,834 A | 1/1997 | Wilson et al. ................ 429/30 |
| 5,635,039 A | 6/1997 | Cisar et al. ................... 204/252 |
| 5,683,828 A | 11/1997 | Spear et al. ................... 429/13 |
| 5,716,437 A * | 2/1998 | Denton et al. ........... 106/31.92 |
| 5,747,185 A | 5/1998 | Hsu ............................. 429/44 |
| 5,983,488 A * | 11/1999 | Erickson et al. .............. 29/731 |
| 6,074,692 A * | 6/2000 | Hulett ......................... 427/115 |

* cited by examiner

TECHNIQUE FOR RAPID CURED ELECTROCHEMICAL APPARATUS COMPONENT FABRICATION

CROSS-REFERENCE TO RELATED APPLICATIONS

This application claims priority under 35 USC 119(e) from U.S. Provisional Patent Application Serial No. 60/146,289 filed on Jul. 29, 1999.

TECHNICAL FIELD

This invention relates to a technique for multi-layer fabrication of components for an electrochemical apparatus. More particularly it relates to a method for producing fine features on components for an electrochemical apparatus. In a preferred embodiment, it relates to a method of creating component features made of electrochemically active material by using radiation curable polymers combined with electrochemically active materials applied by printing in a specified pattern.

BACKGROUND OF THE INVENTION

Attempts have been previously made to provide for reproducibility of electrochemical device component materials, to decrease the expense in production methods, to use less high cost materials, to lower the overall cost of the component, and, in the case of gas permeable electrodes, to decrease the back pressure of the electrode material by using thinner layers with higher porosity. A feasible method of accomplishing these goals has not yet been achieved.

Methods of fabrication that have been used for components in electrochemical device such as fuel cells, electrolyzers, electrochemical transport reactors and others include a variety of conventional techniques such as photolithography, pressing, calendering, deposition techniques, or printing. Features in individual components may be induced in the components by electrical-discharge machining, stamping, laser ablation, chemical etching, ultrasonic etching, scribing, and grinding.

As an example of a well developed electrochemical apparatus, fuel cells offer many advantages over conventional power generation systems. It is generally known that such devices are capable of delivering high quality electric power with greater efficiency and lower emissions when compared to comparably sized gas or diesel fed generators. Further, because such systems are generally modular they can serve a wide range of power demands from remote site power generation, central utility, and transportation applications as well as commercial and residential applications. A type of fuel cell to which this invention is applicable is the solid oxide electrolyte fuel cell (SOFC).

In traditional SOFCs, air brushing or ink printing of layered structures requires either long drying times or a separate piece of equipment such as a heated drying oven. Attempts to apply additional layers on uncured layers leads to very poor layer definition (e.g., blurring, bleeding, sagging) and yield generally unsatisfactory results.

By contrast, photon-catalyzed binder systems often cure within seconds. Exposure to certain frequencies of radiation creates activated carbon centers (carbon radicals) on the binder system's polymer chain that initiate the cross linking and causes the polymer to harden. Frequently, organic compounds that are sensitive to particular radiation frequencies are incorporated into the binder system as a second component. These compounds, termed initiators or photo-initiators, are generally selected to be sensitive to radiation frequencies in ranges that are either easy to produce or that are free from interference from other components that may be in suspension in the binder. The preferred photon source for initial evaluation is an ultraviolet laser. Ultraviolet cured polymer systems are well documented and widely used in a number of industries. There are several other types of radiation curable polymers that are known in various fields; electron beam (EB), infra-red (IR), radio frequency, visible light, and microwave cured systems. An alternative method of rapidly curing polymers is by direct chemical initiation, that is, a rapidly catalyzed polymer system.

For multi-layer printing, a well defined registration reference point is also required which is not always practical in solid oxide fuel cell (SOFC) designs. In one cell design, three axial reactant feed holes provide an excellent opportunity for registration and alignment. However, for precise alignment, even these reference points are not always ideal since the substrate is a 'net shape' part and may still exhibit some non-uniformity during sintering.

All planar SOFCs have a conceptually similar method for reactant gas distribution. A manifold system (either internal with seals or external) is used to channel gas on opposing sides of an ionic conducting electrolyte membrane. For certain SOFC designs, the reactants are 'channeled' through grooves that are cut or machined into either a metallic or ceramic bipolar separator plate. Some designers have sought to reduce costs by employing light foil corrugated separators.

One SOFC design uses an alternate method of distribution and instead, distributes the reactants through porous electrode material. This has the advantage of being a net shape part without post processing and facilitates a flat, featureless separator that is conducive to mass production at minimal cost. However, current methods of porous electrode production involve techniques that produce significant waste material (thereby increasing cost) and do not allow for flow complexities that may improve electrochemical performance.

In order to produce a component or feature of a component using a multi-pass printing technique, registration of an array is required. In practice, proper registration of the array is critical in order to ensure uniform height and contact area and has been beyond the existing state of the art. To achieve reliable low cost fabrication, a method of creating electrochemical apparatus component features, such as integral gas distribution manifolds is required.

It is therefore an object of this invention to establish a method of manufacture of electrochemical device components that allows rapid fabrication, in one embodiment, preferably based upon common fabrication methods such as printing.

It is yet another object of the present invention in another embodiment to include easily graded properties including composition, morphology, and geometry into the electrochemical device components without increasing fabrication complexity or cost.

It is yet another object of one embodiment of the present invention to build up thick layers without complicated registration issues.

At least one or more of the foregoing objects, together with the advantages thereof over the knowvn art relating to a method for fabricating components for an electrochemical apparatus, which shall become apparent from the specification that follows, are accomplished by the invention as hereinafter described and claimed.

SUMMARY OF INVENTION

This invention is a process by which features of components of an electrochemical apparatus can be screen-printed using multi-layer techniques with minimal waste. This single production method simplifies the current production process and decreases the costs for production. In one embodiment, the entire cell (gas distribution manifold, seals, current distribution layers, and primary electrodes) can be produced using this method.

To address the problems in the present SOFC electrode system, we have increased the porosity of the electrode, by applying the low field by printing, using novel polymer systems. These polymer systems use a rapidly cured binder in the printing ink to produce multi-layer components without the need for re-alignment (re-registry between prints). This is a processing change which increases performance and lowers back pressure, engendering the benefits set forth below.

This invention provides a component for an electrochemical apparatus and a process for the fabrication of a component for an electrochemical apparatus including providing a printing medium comprising a rapid curable polymer containing carrier and a powder of a component material precursor; printing one of a uniform layer or a pattern of the printing medium on a substrate, and rapidly curing the curable polymer to form a cured part.

Additionally, the invention provides an electrochemical apparatus and a process for the fabrication of a component feature for an electrochemical apparatus comprising: providing a printing medium which includes a rapid curable polymer, and a powder of a component material precursor, printing a component feature with the printing medium on a substrate, and rapidly curing the curable polymer to form a cured part. The component feature may be one of a uniform layer or a pattern of material.

This invention also provides an electrode for an SOFC and a process for the fabrication of an electrode for an SOFC comprising providing a printing medium comprising a rapid curable polymer containing carrier and a powder of an electrode material precursor, printing one of a uniform layer or a pattern of the printing medium on a substrate, and rapidly curing the curable polymer to form a cured part.

Additionally, this invention provides an SOFC, a component of an SOFC, and a process for the fabrication of a component for a multi-layer cell of an SOFC which includes providing a printing medium comprising a rapid curable polymer containing carrier and a powder of a component material precursor, printing one of a uniform layer or a pattern of the printing medium on a substrate, and rapidly curing the curable polymer to form a cured part.

The invention further provides a multi-layer cell of an SOFC, an SOFC, and a process for the fabrication of a multi-layer cell of an SOFC comprising a) providing a first printing medium comprising a radiation curable polymer containing carrier and a powder of a first component material precursor; b) printing one of a uniform layer or a pattern of the first printing medium on a substrate; c) radiation curing the curable polymer to form a cured part, and; repeating steps a), b), and c) with at least a second printing medium containing a powder of a component material precursor of at least one subsequent component.

In certain embodiments, the rapid curable polymer is a radiation curable polymer, and cure of the polymer during fabrication is by radiation curing. The radiation cure can be by any of the following means: ultraviolet, infrared, electron beam, radio frequency, visible light and microwave, and techniques for their use are well knowvn in the art. Where radiation curing is by ultra-violet, infrared or visible light, the printing medium may include a radiation curable polymer, a carrier, and a photo-initiator. An alternative method of rapidly curing of polymers is by direct chemical initiation, that is, a rapidly catalyzed polymer system. A chemical initiator can be sprayed concurrently with or alternatively onto, the rapidly curable polymer.

The invention also provides for heat treating the cured part to form the component.

DETAILED DESCRIPTION OF THE INVENTION

Figure 1:
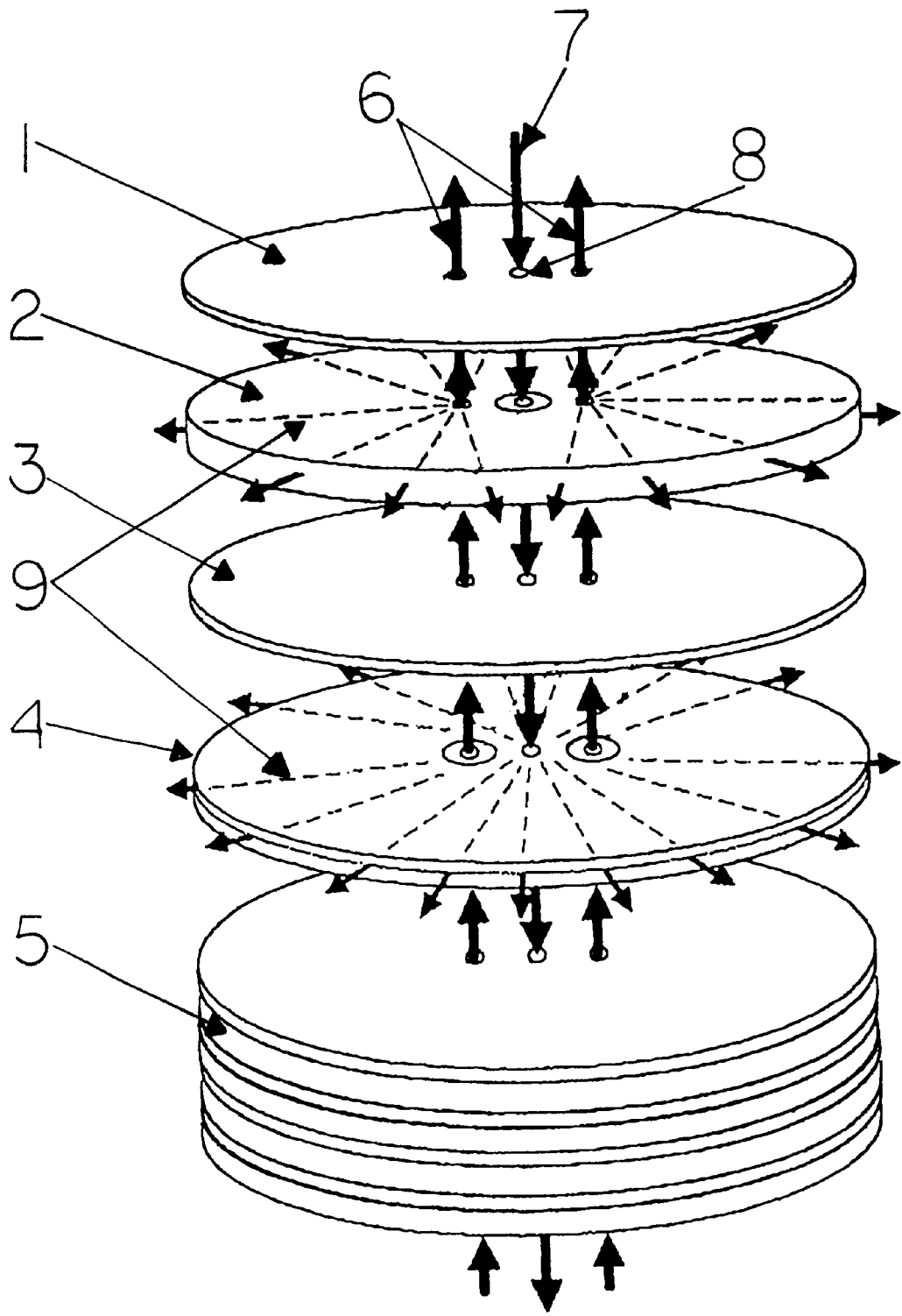
FIG. 1 is a partially exploded schematic of a solid oxide fuel cell (SOFC) single cell and a multiple cell stack.

The invention provides a process for fabrication of components for an electrochemical apparatus using a printer, including in one embodiment, combining electrochemically active material powder with a polymeric carrier, applying the combination of the powder and polymeric carrier to a substrate using a printing technique and curing the polymeric carrier. The component may be further formed by heat treating the cured part, such as by sintering. The substrate can be a portion of the component being fabricated in the process, or can be a component adjacent to the component being fabricated. For example, an electrode can be printed onto a solid oxide electrolyte or a separator.

More broadly, the invention permits the fabrication of a component or a component feature for an electrochemical apparatus, whether or not electrochemically active, by providing a printing medium comprising a rapidly curable polymer containing carrier and a powder of a component material precursor, printing either a uniform layer or a pattern of such printing medium on a substrate, and rapidly curing the curable polymer to form a cured part. The rapid curing may be effected by radiation initiation or by direct chemical initiation.

In one embodiment, the direct chemical initiation is accomplished by simultaneous deposition of the printing medium and the catalyst. This printing technique is knowvn in the art as dithering. Discrete amounts of distinct materials are deposited so that they are combined on the substrate. In an alternate embodiment, plural spraying is used to simultaneously deposit the printing medium and the direct chemical initiating catalyst. Plural spraying is known in the art as a technique for combining two separate materials immediately prior to application. Generally, this combining occurs in the spray tip or nozzle of the application device.

In one embodiment, this invention permits the fabrication of a component, such as an electrode, up to a multi-layer cell, for an SOFC by providing a printing medium comprising a rapid curable polymer containing carrier and a powder of a component material precursor, printing one of a uniform layer or a pattern of such printing medium on a substrate, and rapidly curing the curable polymer to form a cured part.

To fabricate the multi-layer cell, each component can be fabricated in a series of successive passes through the printing process.

According to the invention, radiation may be used to cure the polymer during fabrication, and heat treating of the cured part may be used to form more completely the component. The radiation can be any of the following: ultraviolet, infrared, electron beam, radio frequency, visible light and microwave, and techniques for their use are well known in the art. As some photoresist technologies use visible light as an initiator, visible light activation could be applicable to radiation curing according to the present invention.

High energy electron curing of polymers is generally by a free-radical chain reaction. Suitable polymers include, but are not limited to multi-functional acrylate or methacrylate unsaturated polymers. Solvents for die polymers, if present, are generally nonvolatile and 100% co-reactive with themselves and other organic components in the printing medium.

Curing of polymers by ultraviolet, infrared or visible light generally utilize a photoinitiator, a photoactive catalyst, or a reactive functionality to absorb the radiant energy and form reactive intermediates that induce chain scission and/or cross-linking to initiate the curing process. These photosensitive compounds are known in the art, and upon exposure to light can form free-radical intermediates by photofragmentation, or free-radical species by electron transfer followed by proton transfer. Light induced photo-initiator free radical intermediates can induce curing in polymer printing media which contain combinations of single vinyl unsaturated monomers, multifunctional vinyl-substituted cross-linking oligomers, and a variety of unsaturated polymer structures. Photoactive catalyst systems are used to cure epoxy resins and multifunctional vinyl materials, and include, among others, aryldiazonium salts, triarylsulfonium salts, and diaryliodonium salts. Cation-intermediate-generating catalysts include cyclopentadienyl iron (II)-arene hexafluorophosphate complexes, phenylphosphonium benzophenone salts, and pentafluoro phenyl borate anions associated with aryl sulfonium cations.

Radiation curing of polymers and reaction medium components are described in J. P. Fouassier, "Photopolymerization Reactions", Polymer Handbook, Fourth Edition, Brandup et al. editors, John Wiley & Sons, 1999 pp. 169–181, and V. D. McGinnis, "Radiation Curing", Kirk-Othmer Concise Encyclopedia of Chemical Technology, 4$^{th}$ Edition, 1999 pp. 1703–1704, which are incorporated herein by reference.

The invention in one embodiment includes using a radiation cured polymer matrix, multi-layer printing technique that facilitates rapid fabrication of complete cells including gas distribution manifold, seals, current distribution layers, and electrochemical components with minimal waste products. This technique offers a very low cost fabrication method that is already widely instituted in other industries and which we have adapted to a multicomponent solid oxide fuel cell system (both die planar and tubular SOFC systems). This technique is particularly well suited to the flat plate radial cells used in solid oxide fuel cell (SOFC) small-power generator systems, a example of which is shown in FIG. 1. The ability to produce the solid oxide fuel cell (SOFC) at low unit cost is desired to achieving success in any fuel cell market. A preferred embodiment includes the use of ultra-violet cured polymer systems, since that class of binder is well defined.

FIG. 1 shows a partially exploded schematic of a solid oxide fuel cell (SOFC) single cell and a multiple cell stack 5. Each cell is made up of four layers: a porous, anode 4 such as nickel cermet or mixed-electron/ion-conducting material; a sintered, non-porous, electrolyte 3 such as yttria-stabilized zirconia; a porous, cathode 2 such as strontium-doped, lanthanum manganite or mixed-electron/ion-conducting material; and separator 1, preferably a high-temperature metal alloy. The chemical composition of the components is provided for illustration only, as various known and proprietary materials are used in SOFC devices of this type. Other embodiments of the solid oxide fuel cell and its components are disclosed in U.S. Pat. Nos. 5,445,903 and 5,589,285, assigned to the common assignee of the present invention, which patents are hereby incorporated by reference as if fully written out below.

Figure 2:
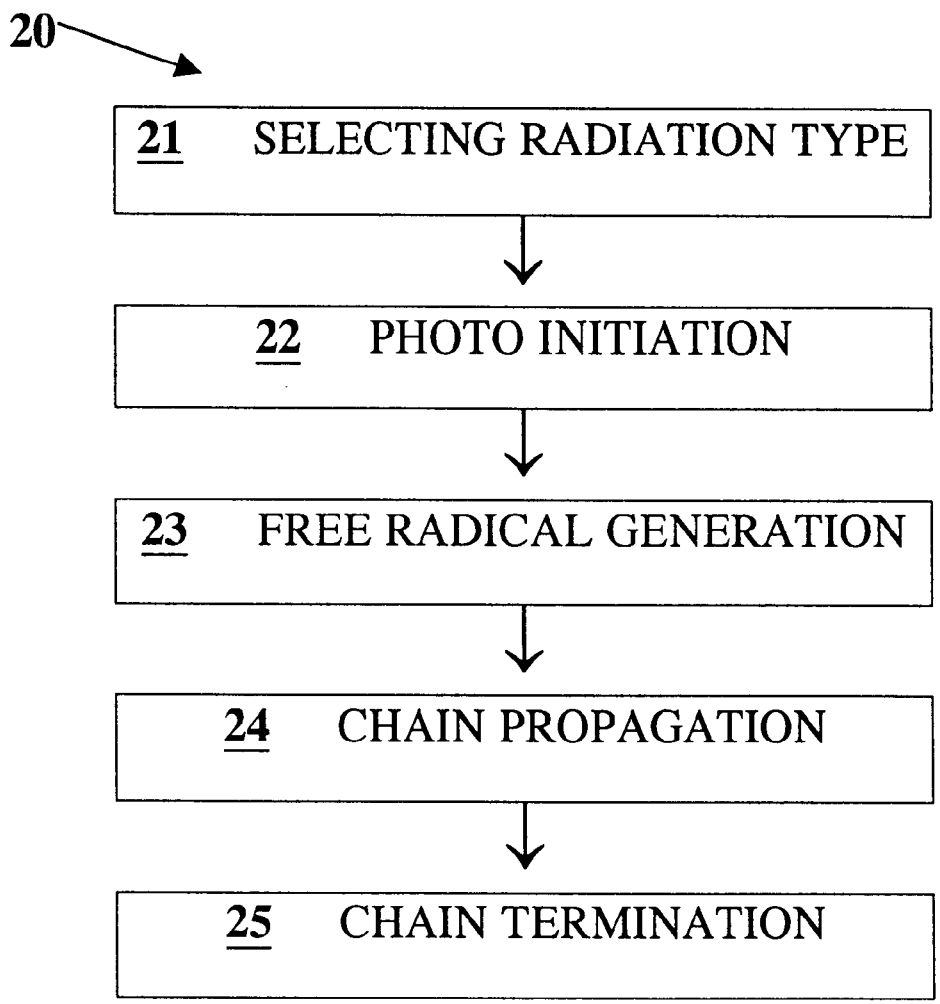
FIG. 2 is a flow chart detailing the steps and mechanisms involved with utilizing a UV catalyzed binder system.

UV polymerized systems have been widely discussed for application in a number of industries, particularly for painting and stenciling, where excessive drying time can represent a significant financial liability. FIG. 2 shows a flow diagram 20 of a UV polymer curing process. Many factors must be considered to develop a suitable polymer vehicle for a particular dispersed material. In selecting a system suitable for complex, three-dimensional, electrochemically active structures, the focal criteria will be selection of the wavelength, the exposure time, and the thickness of the films. The wavelength must be selected so as to not interfere with the electrode material itself. The exposure time dictates the time between prints and, inevitably, the final cost of the electrochemical device. The target thickness will define the number of passes (affecting cost) and in a manifolding component, the maximum possible height of the customized flow fields. In one embodiment, the manifold flow field, which may be an electrode component, comprises an array of pillars of electrode material within the a electrode layer, formed by one or more printing passes. Electrode flow field configurations in solid oxide fuel cells are described in detail in commonly assigned U.S. Ser. No. 09/455,149, which is incorporated by reference as if fully written out below.

Some considerations in the selection of polymer matrix precursor components for radiation curing according to the present invention are listed below.

Selecting Radiation Type 21

Absorption by monomers and oligomers;

Absorption by pigment, extenders, and other components;

Reflection by pigment and other components;

Transmission by pigment and other components;

Substrate effects.

Photo-initiation 22

Fluorescence;

Phosphorescence;

Quenching;

Substrate effects.

Free Radical Generation 23

Substrate effects;

Recombination;

Absorption by pigments, extenders, and other components;

Side reactions;

Degradation;

Rearrangements;

Odor generation;

Oxygen inhibition;

Branching;
Chain termination
Adequacy of cure.
Chain Propagation 24
Rearrangements;
Odor generation;
Oxygen inhibition;
Branching;
Chain termination
Adequacy of cure.
Molecular weight;
Crosslink density.

Consideration of these factors is interrelated among the above steps, which precede chain termination 25, and result in the selection of the following variables.

Radiation wavelength;
Photo-initiator(s);
Ratio of photo-initiators;
Photo synergists;
Exposure time;
Type and level of pigment and extender;
Film thickness;
Type and level of monomer(s);
Type and level of oligomer(s);
Type and level of additives.

In the fuel cell design shown in FIG. 1, fuel 7 and oxidant 6 are supplied through holes 8 in the center of the cell and co-flow radially outward through porous electrode pathways 9. Internal manifolding minimizes the seal perimeter area between the fuel and oxidant ports and eliminates the need for exhaust manifolds at the circumference of the cells. At the circumference, the remaining fuel and excess oxidant mix and react to virtually complete fuel oxidation before exiting as exhaust.

Bipolar cells are stacked and connected in series, to obtain higher voltage outputs. Stacks of 600 to 1,000 cells will produce approximately 2 kW to 3 kW of power. Spring loading of the stack accommodates axial dimensional change caused by thermal expansion and any gradual thickness changes of the cells themselves. Upright stacks can be nested next to each other to produce higher power modules. A 100-kW system module can be made by ganging together approximately 80 stacks, for instance.

The "printing" of SOFC components is accomplished with conventional automatic industrial printers, including but not limited to, screen printing equipment. An example would be a "Model NCC Rotary Index Screen Printer" from Systematic Automations of Bloomfield Conn. According to the manufacturer, this system includes printing and curing options with up to 10 independent stations. This equipment allows for printing directly onto a separator or an electrolyte (using the multi-layer technique) of the manifolding, sealing, current distribution, and electrochemically active layers. Each station allows for printing of a specific layer and geometry. For the solid oxide fuel cell (SOFC), the gas distribution and current distribution layers are essentially integrated and, in a preferred embodiment, are a sparse array of electrical contact points. This array reduces the material usage to a minimum and, coupled with the high yield and low waste of an industrial printing system, present a very attractive cost potential.

The printing of components according to the invention provides the ability to easily and inexpensively grade the component material during fabrication. The multi-pass technique allows changes in composition, morphology and geometry during the fabrication and does not increase complexity or cost of the process.

The use of a rapidly curable polymer facilitates rapid printing by dramatically accelerating the traditional method of print/dry/print/dry (wherein each step generally requires direct manipulation of the substrate). This technique further allows for customization of electrode flow field geometry, which can be optimized based upon performance considerations.

This approach has a number of technical and commercial advantages. The first is tremendous design flexibility. With screen printing, virtually any visible pattern that can be drawn using the commercially available AutoCAD™ software can be transferred to the cell surface. This flexibility allows for optimizing forced gas flow patterns in a gas distribution flow field. To a limited degree, patterns can even be extended in three dimensions, allowing for the formation of cavities that can be filled later with other materials. Also, the layers can be built up in three dimensions using functionally graded materials to accommodate stresses while customizing performance. Adjustments can be made to the component material composition, morphology and geometry. This can be done during fabrication without increasing the cost or complexity of the component.

The second advantage is that it can be applied to essentially any typical solid oxide fuel cell (SOFC) material. Printing can be used to apply electrode materials (such as $LaMnO_3$, $LaCoO_3$, Ni—$CeO_2$, etc.) but can readily be extended to other materials including metallic powders (nickel, Inconnel™, etc.) and even advanced electrolyte materials such as $LaGaO_3$.

The third advantage is that printing can be highly automated. With the decrease in human intervention the production rates can increase and the defect rate can decrease.

Essentially, within one printing unit, the gas manifold/current collector and seal material can be applied and repeat unit cells produced. Commercially available units can have at least 10 stations, which would be enough for two cell fabrication pathways per rotation (as each cell would have two collector/manifolds and two seal steps).

This technology is applicable to virtually all solid oxide fuel cell (SOFC) designs including tubular fuel cells. For example, one of the primary uses of industrial printing is for aluminum cans. Pencils, pens, and a host of other 'cylindrical' shapes are printed. The same build up technology could be applied to tubular fuel cell structures as well, as modified according to the invention to accommodate electrochemically active material fillers.

There are several considerations when selecting the polymer carrier. The solid oxide fuel cell (SOFC) operates at above 600 degrees Celsius, therefore polymer decomposition products are a consideration. The polymeric ink vehicle should decompose completely and, preferably, leave no residue. Of particular concern as contaminants are sodium, phosphorous, and sulfur. All are frequently included as counter-ions in dispersants and surfactants commonly found in polymeric systems. The invention therefore preferably utilizes those polymer systems that use ammonium counter-ions or phenolated carbonic acid derivatives such Darocure 1173, Duracure 1116, or Irgacure 500 (all available from Ciba-Geigy Chemical Company).

Curing rate is another important factor. Photon-catalyzed polymer systems set-up quickly due to polymerization cross-linking reactions. These reacfions are initiated by high-energy photons cleaving bonds on the polymer backbone, creating activated carbon centers. Ultraviolet, microwave, infrared, visible light and electron beam radiation are all suitable initiators. The carbon centers are highly reactive and bond to adjacent polymer molecules leading to a rigid, heavily cross-linked matrix. A challenge is that some solid oxide fuel cell (SOFC) materials, notably sub-micron LaMnO$_3$, can also interact with some polymer matrices and create activated carbon centers. This can lead to premature cross-linking and lead to the printing ink solidifying on the printer, thus fouling the operation. The selection of binder and curing radiation must avoid this potential interaction.

Other effective polymeric ink vehicles include proprietary acrylic systems provided by Polymeric Imaging. These systems are catalyzed by UV radiation and include their own proprietary photoinitiator. We have found longer UV radiation wavelengths around 365 nanometers to be more effective in curing these systems than shorter wavelengths around 255 nanometers, but both wavelengths are readily available and can be obtained through lamps purchased though Cole-Palmer. These systems are effective vehicles for cathode, anode, and seal materials.

Typically, single pass screen-printing is limited to 10–25 microns in thickness. An array of electrode pillars with a printed thickness of approximately 200–400 microns is beneficial to single cell performance and also has a low consumption of electrode material (e.g., lower cost). Multiple pass printing achieves these desirable electrode heights (thicknesses).

Figure 3:
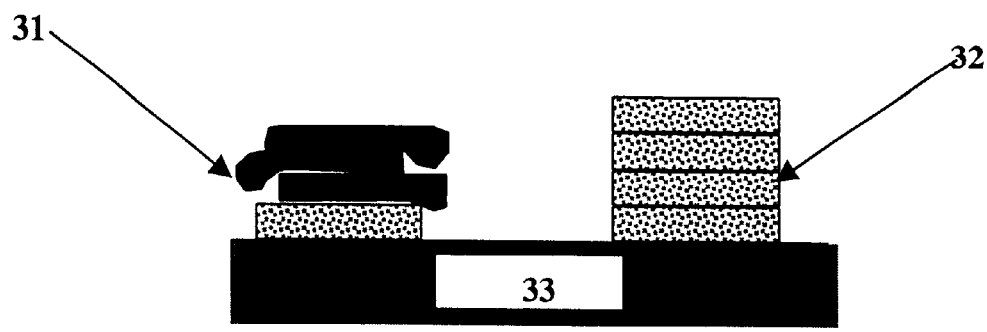
FIG. 3 is a cutaway side elevational view of a comparison of screen printing layers produced by registration techniques only, and by the process of the present invention.

Complete alignment of each print so that the pillars of electrode material are of uniform height and dimension is desirable. A vacuum fixture is used to hold the substrate in the automatic printing unit. Passes are made with intermittent drying/curing steps. The final structure and alignment is verified by parallel light photo-microscopy and by direct mechanical measurement. FIG. 3 illustrates, by way of a cross-sectional view, the pillar layer alignment performance difference between the traditional layering techniques 31 and an embodiment of the claimed process 32 deposited on a substrate electrolyte 33. The traditional method does not allow for good replication and consistency of the layers that form the gas flow field in the deposited layer.

Specifically, highly conductive, electrochemically active electrode powders are combined with a catalyzed polymer vehicle to produce an epoxy-like polymer that can be applied and rapidly cured using a number of different methods. The polymer is rapidly catalyzed using radiation, such as ultraviolet light, or by direct chemical initiation, thereby allowing for rapid, multi-layer applications with tailored properties. In one discrete embodiment, ultraviolet light catalyzed polymers are combined with anode powder and applied by printing techniques in a specific pattern to optimize gas flow.

While the making of a fuel cell is known in the prior art, it fails to address some of the problems discussed above. The cost of fabrication can be substantially cut and flexibility increased by replacing the typical electrode application technique with high-speed, multi-pass printing techniques based on a radiation cured, such as ultraviolet-cured, ink polymer vehicle. This change in process dramatically increases the opportunity for creating custom fuel and/or gas flow distribution patterns in the electrode, that can be optimized based upon engineering considerations, while reducing fabrication and capital costs.

Using a low wattage ultraviolet laser, "on-printer" curing of the custom flow distribution pattern is possible. In essence, the electrolyte substrate is never moved from the fixture (preferably held in place by a vacuum). This mitigates the difficulties of complex registry and enables multi-pass printing. Further, the process allows for complex geometric flow patterns, made from highly conductive, reactive electrode materials, without the complexity of expensive equipment. Customization of the flow geometry allows for substantial benefits including increased efficiency as well as air and fuel management. The implementation of a simple, low cost method to add features to the gas distribution electrodes allows for custom control of performance without substantially increasing cost of manufacture.

Figure 4:
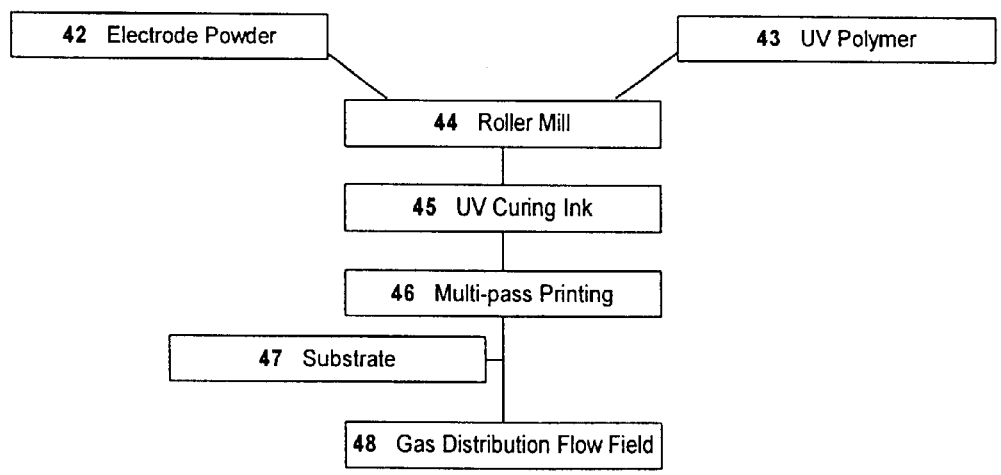
FIG. 4 is a flow chart of the process of fabrication of a SOFC electrode.

FIG. 4 is a flow chart showing the process of fabricating a SOFC electrode. It illustrates the combining of the electrode powder 42 and the polymer carrier 43 on a roller mill 44 to provide the radiation curable ink 45. The curable ink is provided for application according to the multi-pass printing technique 46, onto a substrate 47, for the fabrication, according to one embodiment of the invention, of a fuel cell electrode having a gas distribution flow field pattern 48. The entire component can be formed on a substrate in this manner, or morphological features of the component can be formed using the component as a substrate.

PREFERRED EMBODIMENT FOR CARRYING OUT THE INVENTION

A preferred embodiment for carrying out the invention is a process for the multi-layer fabrication of electrode components for an electrochemical apparatus using a printer. The process provides a concurrent or previous combining of the electrode powder with the polymeric carrier, and applying the combination of electrode powder, polymeric carrier and optionally a catalyst to a substrate using a printing technique and curing the polymeric carrier.

Air or oxygen electrode materials for oxygen reduction cathodes may include cation-substituted lanthanum manganite, cation-substituted lanthanum cobaltite, and cation substituted lanthanum ferrite. These are in the class $Re_{(1-X)}A_X Tm_{(1-Y)}B_Y O3$ is a rare earth such as La, A is another rare earth such as Sm, Pr, Y, Yb or an alkaline earth metal such as Sr, or Ca, Tm is a transition metal such as Co, Fe, Mn, Cr, and B is either another transition metal or Mg, Zn, or Al. Double doping of the rare earth is also possible so that "A" is actually two components such as La(Sr,Pr) MnO3.

Fuel electrode materials for oxygen evolution anodes may include the family of 'air' electrodes described above (which also work well as anodes). Anodes also may include metal-oxide cermet compositions such as reduced Metal+Oxide Ceramic where the metal includes Ni, Co, Fe, Pt, Pd, and Ag and the oxide ceramic component is typically an oxygen conductor and includes cation doped zirconia, cation-doped ceria, and some mixed electronic/ionic conducting perovskites or Brown Millerites such as doped $SrCeO_3$.

In a preferred embodiment the printer is a high-speed multi-pass printer such as a Model NCC Rotary Index Screen Printer. Also preferred is the electrode powder being at least one of $LaMnO_3$, $LaCoO_3$, and Ni—$CeO_2$ cermet. The electrode powder is preferably combined with a polymeric carrier, such as an ultraviolet light curable epoxy polymer, on a roller mill and provided to the printing apparatus for application in a predetermined pattern, onto a separator or a solid oxide electrolyte. Several layers of the electrode are applied in a series of printing passes, each followed by curing of the polymeric carrier vehicle, to build up a three dimensional electrode structure. Curing is preferably accomplished by a low wattage ultraviolet laser. In one embodiment, the resulting electrode is for use in a solid oxide fuel cell. The cured electrode material is heat treated at above about 600 degrees Celsius to complete the fabrication of the electrode.

Similarly, other components of the SOPC can be fabricated using the technique of the present invention.

It should be appreciated that the present invention is not limited to the specific embodiments described above, but includes variations, modifications and equivalent embodiments defined by the following claims.

What is claimed is:

1. A process for the fabrication of a three dimensional component for an electrochemical apparatus comprising:
   a) providing a printing medium comprising a rapid curable polymer containing carrier and a powder of a component material precursor;
   b) successively printing at least one of uniform layers or patterns of the printing medium on a substrate; and
   c) rapidly curing the curable polymer to form a cured part.

2. The process of claim 1 further including heat treating the cured part to form the three dimensional component.

3. The process of claim 1 wherein the rapid curing is radiation curing by a radiation curing means selected from the group consisting of ultraviolent, infrared, electron beam, radio frequency, visible light and microwave.

4. The process of claim 1 wherein the rapid curing is effecting direct chemical initiation.

5. A process for the fabrication of a three dimensional component feature for an electrochemical apparatus comprising:
   a) providing a printing medium comprising a rapid curable polymer, and a powder of a component material precursor;
   b) printing the three dimensional component feature with the printing medium on a substrate, and;
   c) rapidly curing the curable polymer to form a cured part.

6. The process of claim 5 further including heat treating the cured part to form the component.

7. The process of claim 5 wherein the substrate is a portion of the component.

8. The process of claim 5 wherein the substrate is an adjacent component.

9. The process of claim 5 wherein the printing medium includes a radiation curable polymer, a carrier, and a photo-initiator, and wherein the rapid curing is radiation curing by a radiation curing means selected from the group consisting of ultraviolet, infrared, electron beam, radio frequency, visible light and microwave.

10. A process for the fabrication of a three dimensional electrode for an SOFC comprising:
    a) providing a printing medium comprising a rapid curable polymer containing carrier and a powder of an electrode material precursor;
    b) successively printing at least one of uniform layers or patterns of such printing medium on a substrate, and;
    c) rapid curing the curable polymer to form a cured part.

11. The process of claim 10 further including heat treating the cured part to form the three dimensional electrode.

12. The process of claim 10 wherein the substrate is a portion of the three dimensional electrode.

13. The process of claim 10 wherein the substrate is a component adjacent to the three dimensional electrode.

14. The process of claim 10 wherein the rapid curing is radiation curing by a radiation curing means selected from the group consisting of ultraviolet, infrared, electron beam, radio frequency, visible light and microwave.

15. A process for the fabrication of a three dimensional component for a multi-layer cell of an SOFC which includes providing a printing medium comprising a rapid curable polymer containing carrier and a powder of a component material precursor, successively printing at least one of uniform layers or patterns of the printing medium on a substrate, and rapidly curing the curable polymer to form a cured part.

16. The process of claim 15 further including heat treating the cured part to form the three dimensional component.

17. The process of claim 15 wherein the rapid curing is radiation curing by a radiation curing means selected from the group consisting of ultraviolet, infrared, electron beam, radio frequency, visible light and microwave.

18. The process of claim 15 wherein the rapid curing is by effecting direct chemical initiation.

19. A process for the fabrication of a multi-layer cell of an SOFC comprising:
    a) providing a first printing medium comprising a radiation curable polymer containing carrier and a powder of a first component material precursor;
    b) successively printing at least one of uniform layers or patterns of the printing medium on a substrate;
    c) radiation curing the curable polymer to form a cured part, and;
    d) repeating steps a, b, and c with at least a second printing medium containing a powder of a component material precursor of at least one subsequent component.

20. The process of claim 19 further including heat treating the cured part to form the component.

21. The process of claim 19 wherein the substrate is a portion of the first component.

22. The process of claim 19 wherein the substrate is a component adjacent to the first component.

23. The process of claim 19 wherein the radiation is selected from the group consisting of ultraviolet, infrared, electron beam, radio frequency, visible light and microwave.

24. An electrochemical apparatus manufactured using the process of claim 1.

25. An electrochemical apparatus manufactured using the process of claim 5.

26. A three dimensional electrode for a solid oxide fuel cell produced by the process of claim 10.

27. A solid oxide fuel cell manufactured by the process of claim 15.

28. A solid oxide fuel cell manufactured by the process of claim 19.

29. A multi-layer cell of a solid oxide fuel cell produced by the process of claim 19.

30. The process of claim 1, wherein the pattern defines a gas distribution flow field.

* * * * *